US011899201B2

(12) United States Patent
Inoue et al.

(10) Patent No.: US 11,899,201 B2
(45) Date of Patent: Feb. 13, 2024

(54) HEAD-UP DISPLAY FOR VEHICLES AND HEAD-UP DISPLAY SYSTEM FOR VEHICLES

(71) Applicant: KOITO MANUFACTURING CO., LTD., Tokyo (JP)

(72) Inventors: Takashi Inoue, Shizuoka (JP); Noriko Sato, Shizuoka (JP); Kouhei Murata, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 147 days.

(21) Appl. No.: 17/439,250

(22) PCT Filed: Mar. 16, 2020

(86) PCT No.: PCT/JP2020/011556
§ 371 (c)(1),
(2) Date: Sep. 14, 2021

(87) PCT Pub. No.: WO2020/189646
PCT Pub. Date: Sep. 24, 2020

(65) Prior Publication Data
US 2022/0146818 A1    May 12, 2022

(30) Foreign Application Priority Data

Mar. 19, 2019 (JP) ................................. 2019-051485
Mar. 19, 2019 (JP) ................................. 2019-051486
Mar. 19, 2019 (JP) ................................. 2019-051487

(51) Int. Cl.
*G02B 27/00* (2006.01)
*B60K 35/00* (2006.01)
(Continued)

(52) U.S. Cl.
CPC .......... *G02B 27/0006* (2013.01); *B60K 35/00* (2013.01); *B60R 1/24* (2022.01);
(Continued)

(58) Field of Classification Search
CPC ................ G02B 27/0006; G02B 27/01; G02B 27/0101; G02B 27/0149;
(Continued)

(56) References Cited

U.S. PATENT DOCUMENTS 5,144,289 A    9/1992  Ohshima
5,305,011 A    4/1994  Furuya et al.
(Continued)

FOREIGN PATENT DOCUMENTS

DE    10 2015 202 457 A1    8/2016
DE       102015202457 A1 *  8/2016
(Continued)

OTHER PUBLICATIONS

International Search Report (PCT/ISA/210) dated Jun. 2, 2020 issued by the International Searching Authority in International Application No. PCT/JP2020/011556.
(Continued)

*Primary Examiner* — Brent D Castiaux
(74) *Attorney, Agent, or Firm* — Sughrue Mion, PLLC

(57) ABSTRACT

A vehicular head-up display that is provided in a vehicle and is configured to display a predetermined image to an occupant of the vehicle includes: a housing that has an opening upward; a transparent cover that covers the opening of the housing; a picture generation section; and a cleaner that is configured to clean an outer surface of the transparent cover. The picture generation section includes: a picture generation unit that is provided inside an accommodation portion formed with the housing and the transparent cover in order to emit light for generating the predetermined image; and a
(Continued)

reflection unit that reflects light so that light emitted by the picture generation unit heads toward a windshield.

18 Claims, 11 Drawing Sheets

(51) Int. Cl.
*B60S 1/54* (2006.01)
*G02B 27/01* (2006.01)
*G06F 3/14* (2006.01)
*B08B 5/02* (2006.01)
*B60R 1/24* (2022.01)
*G06V 20/56* (2022.01)
*B08B 13/00* (2006.01)
*B60R 1/31* (2022.01)

(52) U.S. Cl.
CPC ............... *B60S 1/54* (2013.01); *G02B 27/01* (2013.01); *G02B 27/0101* (2013.01); *G02B 27/0149* (2013.01); *G06F 3/14* (2013.01); *B08B 5/02* (2013.01); *B08B 13/00* (2013.01); *B60K 2370/1529* (2019.05); *B60K 2370/178* (2019.05); *B60K 2370/23* (2019.05); *B60K 2370/658* (2019.05); *B60K 2370/691* (2019.05); *B60R 1/31* (2022.01); *G02B 2027/0141* (2013.01); *G02B 2027/0154* (2013.01); *G06V 20/56* (2022.01)

(58) Field of Classification Search
CPC .... G02B 2027/0141; G02B 2027/0154; B60K 35/00; B60K 2370/1529; B60K 2370/178; B60K 2370/23; B60K 2370/658; B60K 2370/691; B60K 2370/682; B60K 2370/693; B60S 1/54; G06F 3/14; B08B 5/02; B08B 13/00; G06V 20/56; B60R 1/31; B60R 1/24
See application file for complete search history.

(56) References Cited

U.S. PATENT DOCUMENTS

| 2015/0098029 | A1 | 4/2015 | Sato et al. |
| 2016/0144785 | A1* | 5/2016 | Shimizu .................. B60R 11/02 340/435 |
| 2018/0059779 | A1 | 3/2018 | Sisbot et al. |
| 2019/0129172 | A1* | 5/2019 | Misawa ............. H05K 7/20336 |
| 2019/0171287 | A1 | 6/2019 | Sisbot et al. |
| 2019/0196187 | A1 | 6/2019 | Kasazumi et al. |
| 2019/0204592 | A1 | 7/2019 | Fujita |
| 2019/0212550 | A1* | 7/2019 | Fujita ..................... G09G 3/001 |
| 2019/0212551 | A1 | 7/2019 | Fujita |

FOREIGN PATENT DOCUMENTS

| JP | 60-105531 U | | 7/1985 |
| JP | 1-101279 U | | 7/1987 |
| JP | 63-20243 A | | 1/1988 |
| JP | 63-25637 U | | 2/1988 |
| JP | 63-156833 U | | 10/1988 |
| JP | 4-119479 U | | 10/1992 |
| JP | 2001-197337 A | | 7/2001 |
| JP | 2003237411 A | * | 8/2003 |
| JP | 2003237411 A | * | 8/2003 |
| JP | 2004-114709 A | | 4/2004 |
| JP | 2010-188870 A | | 9/2010 |
| JP | 2013-228442 A | | 11/2013 |
| JP | 2018-32402 A | | 3/2018 |
| JP | 2018-45103 A | | 3/2018 |
| JP | 3219639 U | | 12/2018 |
| WO | 2012/131871 A1 | | 10/2012 |
| WO | 2018/055947 A1 | | 3/2018 |
| WO | 2018061690 A1 | | 4/2018 |

OTHER PUBLICATIONS

Written Opinion (PCT/ISA/237) dated Jun. 2, 2020 issued by the International Searching Authority in International Application No. PCT/JP2020/011556.

Extended European Search Report dated Mar. 15, 2022, issued by the European Patent Office in counterpart European Patent Application No. 20773443.5.

* cited by examiner

HEAD-UP DISPLAY FOR VEHICLES AND HEAD-UP DISPLAY SYSTEM FOR VEHICLES

This application is a National Stage of International Application No. PCT/JP2020/011556 filed Mar. 16, 2020, claiming priority based on Japanese Patent Application Nos. 2019-051485, 2019-051486, and 2019-051487, all filed Mar. 19, 2019, the contents of all of which are incorporated herein by reference in their entirety.

TECHNICAL FIELD

The present disclosure relates to a vehicular head-up display and a vehicular head-up display system.

BACKGROUND ART

Patent Literature 1 discloses a head-up display including an optical system for displaying a three-dimensional virtual image using a transparent display medium. This head-up display projects light on a windshield within driver's sight. Some of projected light transmits through the windshield, while some of the rest is reflected by the windshield toward the driver's eyes. The driver perceives the reflected light entering the eyes as a virtual image that appears to be an image of an object on the opposite side (outside the vehicle) across the windshield with a real object visible through the windshield a background.

CITATION LIST

Patent Literature

Patent Literature 1: JP2018-45103A

SUMMARY OF INVENTION

Technical Problem

In a head-up display configured to display an image on a windshield as in Patent Literature 1, a transparent cover is installed facing upward. If dust lies on the transparent cover, the image cannot be appropriately displayed on the windshield.

The present invention provides a vehicular head-up display in which dust does not easily lie on a transparent cover.

Solution to Problem

A vehicular head-up display according to an aspect of the present invention is a head-up display that is provided in a vehicle and is configured to display a predetermined image to an occupant of the vehicle includes:
 a housing that has an opening upward;
 a transparent cover that covers the opening of the housing;
 a picture generation section including:
  a picture generation unit that is provided inside an accommodation portion formed with the housing and the transparent cover in order to emit light for generating the predetermined image; and
  a reflection unit that reflect light so that light emitted by the picture generation unit heads toward a windshield; and
 a cleaner that is configured to clean an outer surface of the transparent cover.

A vehicular head-up display according to another aspect of the present invention is a head-up display that is provided in a vehicle and is configured to display a predetermined image to an occupant of the vehicle includes:
 a picture generation unit that is configured to emit light for generating the predetermined image;
 a reflection unit that reflects light emitted by the picture generation unit to a windshield and includes at least a concave mirror; and
 a shade unit that is capable of blocking light from entering the picture generation unit, wherein
 the shade unit is movable between:
  a closed position in which an optical path between the picture generation unit and the concave mirror is blocked, and
  an open position in which the optical path between the picture generation unit and the concave mirror is not blocked.

A vehicular head-up display system according to another aspect of the present invention is a vehicular head-up display system that is provided in a vehicle and is configured to display a predetermined image to an occupant of the vehicle includes:
 a detection unit that is configured to detect an object based on information acquired from an in-vehicle sensor to determine a position of the object;
 a determination unit that is configured to determine whether the object is in a blind spot of the driver; and
 an image output unit that generates an image indicating the object to cause the image to be displayed on a display unit when a signal is acquired indicating that the determination unit determines the object is in the blind spot.

A vehicular head-up display system according to another aspect of the present invention is a vehicular head-up display system that is provided in a vehicle and is configured to display a predetermined image to an occupant of the vehicle includes:
 a camera that is configured to acquire information on surroundings of the vehicle;
 a windshield or a combiner on which an image acquired from the camera is displayed;
 a detection unit that is configured to detect an object based on information acquired from an in-vehicle sensor to determine a position of the object;
 a determination unit that is configured to determine whether the object is in an area invisible to the camera; and
 an image output unit that generates an image indicating the object to cause the image to be displayed on the windshield or the combiner when a signal is acquired indicating that the determination unit determines the object is in the area invisible to the camera.

Advantageous Effects of Invention

According to the present invention, there is provided a vehicular head-up display in which dust does not easily lie on a transparent cover.

DESCRIPTION OF EMBODIMENTS

Figure 1:
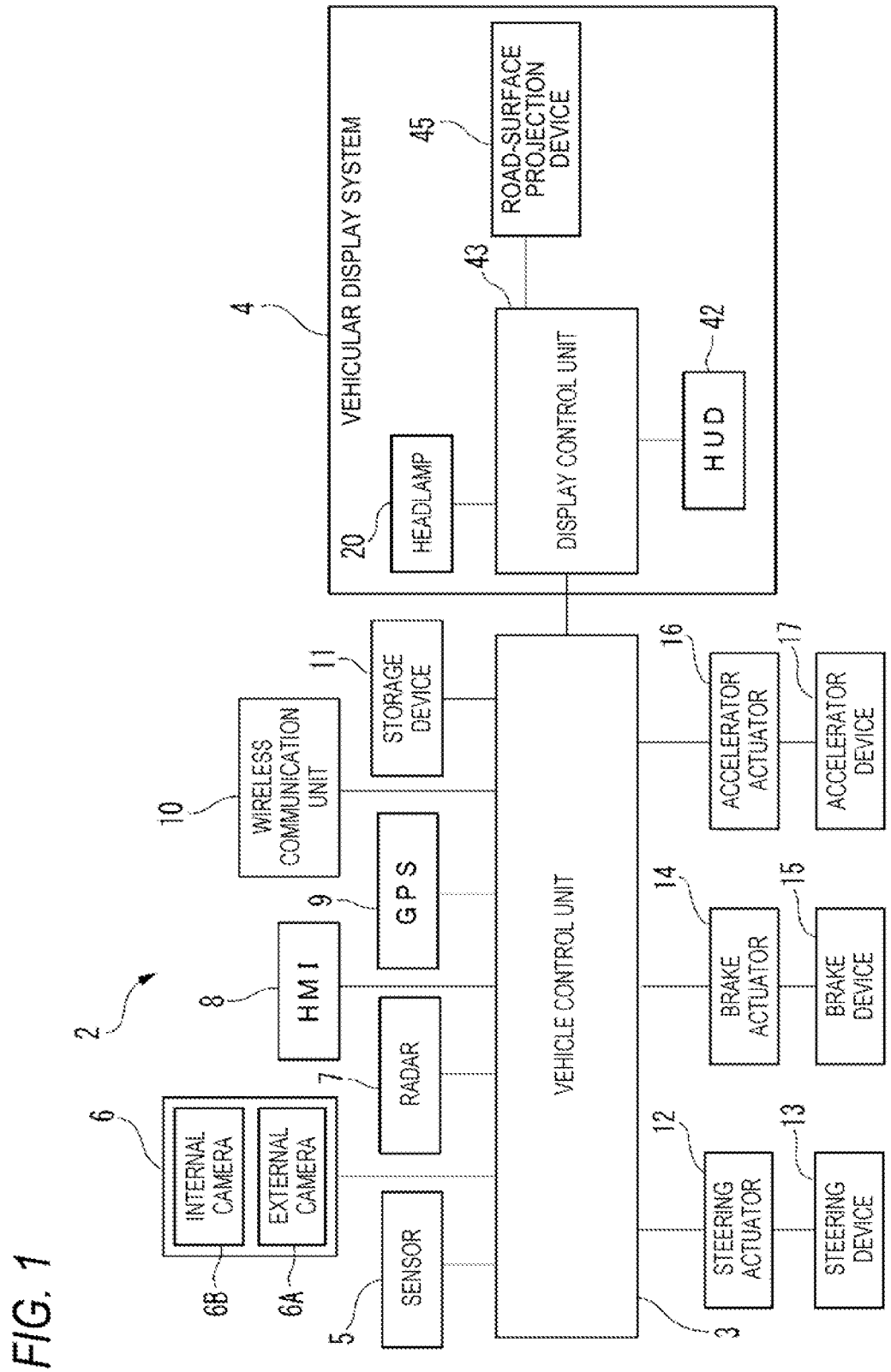
FIG. 1 is a block diagram of a vehicular system including a vehicular head-up display (HUD) according to an embodiment of the present invention.

Hereinafter, an embodiment of the present invention (hereinafter, referred to as the present embodiment) will be described with reference to the drawings. Dimensions of members shown in the drawings may be different from actual dimensions of the members for the sake of convenience of description.

In the description of the present embodiment, for convenience of description, a "left-right direction," an "upper-lower direction," and a "front-rear direction" may be referred to, as appropriate. These directions are relative directions set for a head-up display (HUD) 42 shown in FIG. 2. The "left-right direction" includes a "leftward direction" and a "rightward direction." The "upper-lower direction" includes an "upward direction" and a "downward direction." The "front-rear direction" includes a "frontward direction" and a "rearward direction." Although not shown in FIG. 2, the left-right direction is orthogonal to the upper-lower direction and the front-rear direction.

First, a vehicular system 2 according to the present embodiment will be described below with reference to FIG. 1. FIG. 1 is a block diagram of the vehicular system 2. A vehicle 1 on which the vehicular system 2 is mounted is a vehicle (automobile) that can travel in self-driving mode.

As shown in FIG. 1, the vehicular system 2 includes: a vehicle control unit 3; a vehicular display system 4 (hereinafter, simply referred to as a "display system 4"); a sensor 5; a camera 6; and a radar 7. The vehicular system 2 further includes: a human machine interface (HMI) 8; a global positioning system (GPS) 9; a wireless communication unit 10; a storage device 11; a steering actuator 12; a steering device 13; a brake actuator 14; a brake device 15; an accelerator actuator 16; and an accelerator device 17.

The vehicle control unit 3 is configured to control traveling of the vehicle. The vehicle control unit 3 is configured with, for example, at least one electronic control unit (ECU). The electronic control unit includes: a computer system (for example, a system on a chip (SoC)) including one or more processors and one or more memories; and an electronic circuit including an active element such as a transistor and a passive element. The processor includes, for example, at least one of a central processing unit (CPU), a micro processing unit (MPU), a graphics processing unit (GPU), and a tensor processing unit (TPU). The CPU may include a plurality of CPU cores. The GPU may include a plurality of GPU cores. The memory includes a read-only memory (ROM) and a random-access memory (RAM). The ROM may store a vehicle control program. For example, the vehicle control program may include an artificial intelligence (AI) program for self-driving. The AI program is a program (trained model) constructed by supervised or unsupervised machine learning (in particular, deep learning) in a multi-layer neural network. The RAM may temporarily store a vehicle control program, vehicle control data, and/or surrounding information relating to surroundings of the vehicle. The processor may be configured to load a designated program from various vehicle control programs stored in the ROM onto the RAM to execute various types of processing in cooperation with the RAM. The computer system may be configured with a non-von Neumann computer such as an application specific integrated circuit (ASIC) and a field-programmable gate array (FPGA). The computer system may be configured with a combination of a von Neumann computer and a non-von Neumann computer.

The display system 4 includes: a headlamp 20; a road-surface projection device 45; the HUD 42; and a display control unit 43.

The head lamp 20 is disposed on each of a left side and a right side of a front surface of the vehicle and includes: a low-beam lamp configured to illuminate an area ahead of the vehicle with a low beam; and a high-beam lamp configured to illuminate an area ahead of the vehicle 1 with a high beam. Each of the low-beam lamp and the high-beam lamp includes: one or more light-emitting elements such as a light-emitting diode (LED) and a laser diode (LD); and an optical member such as a lens and a reflector.

The road-surface projection device 45 is disposed in a lamp housing of the headlamp 20. The road-surface projection device 45 is configured to emit a light pattern toward a road surface outside the vehicle. The road surface drawing device 45 includes: a light source unit; a driven mirror; an optical system such as a lens and a mirror; a light-source drive circuit; and a mirror drive circuit. The light source unit is a laser light source or an LED light source. For example, the laser light source is an RGB laser light source configured to emit red laser light, green laser light, and blue laser light. The driven mirror is, for example, a micro electro mechanical systems (MEMS) mirror, a digital micromirror device (DMD), a Galvano mirror, or a polygon mirror. The light-source drive circuit is configured to drive and control the light source unit.

The light-source drive circuit is configured to generate a control signal for controlling operation of the light source unit based on a signal relating to a predetermined light pattern transmitted from the display control unit 43 and then transmit the control signal generated to the light source unit.

The mirror drive circuit is configured to control and drive the driven mirror. The mirror drive circuit is configured to generate a control signal for controlling operation of the driven mirror based on a signal relating to a predetermined light pattern transmitted from the display control unit 43 and then transmit the control signal generated to the driven mirror. If the light source unit is an RGB laser light source, the road-surface projection device 45 can project a light pattern in various colors onto a road surface by scanning with laser light. For example, the light pattern may be an arrow-shaped light pattern indicating a traveling direction of the vehicle.

Projection by the road-surface projection device 45 may be by a raster scanning, digital light processing (DLP), or liquid crystal on silicon (LCOS). If DLP or LCOS is employed, the light source unit may be an LED light source. The projection by the road-surface projection device may be by LCD projection. If LCD projection is employed, the light source unit may be a plurality of LED light sources arranged in a matrix. The road-surface projection device 45 may be disposed in the lamp housing of each of the left headlamp and the right headlamp or on a vehicle body roof, a bumper, or a grille portion.

The HUD 42 is located inside the vehicle at least in part. Specifically, the HUD 42 is disposed in a predetermined location in the vehicle interior. For example, the HUD 42 may be disposed in a dashboard of the vehicle. The HUD 42 functions as a visual interface between the vehicle and an occupant. The HUD 42 is configured to display predetermined information (hereinafter, referred to as HUD information) to the occupant with the HUD information superimposed on the real world outside the vehicle (in particular, surroundings ahead of the vehicle). In this way, the HUD 42 functions as an augmented reality (AR) display. The HUD information, displayed by the HUD 42, is vehicle traveling information relating to traveling of the vehicle and/or surrounding information relating to surroundings of the vehicle (in particular, information relating to an object outside the vehicle).

Figure 2:
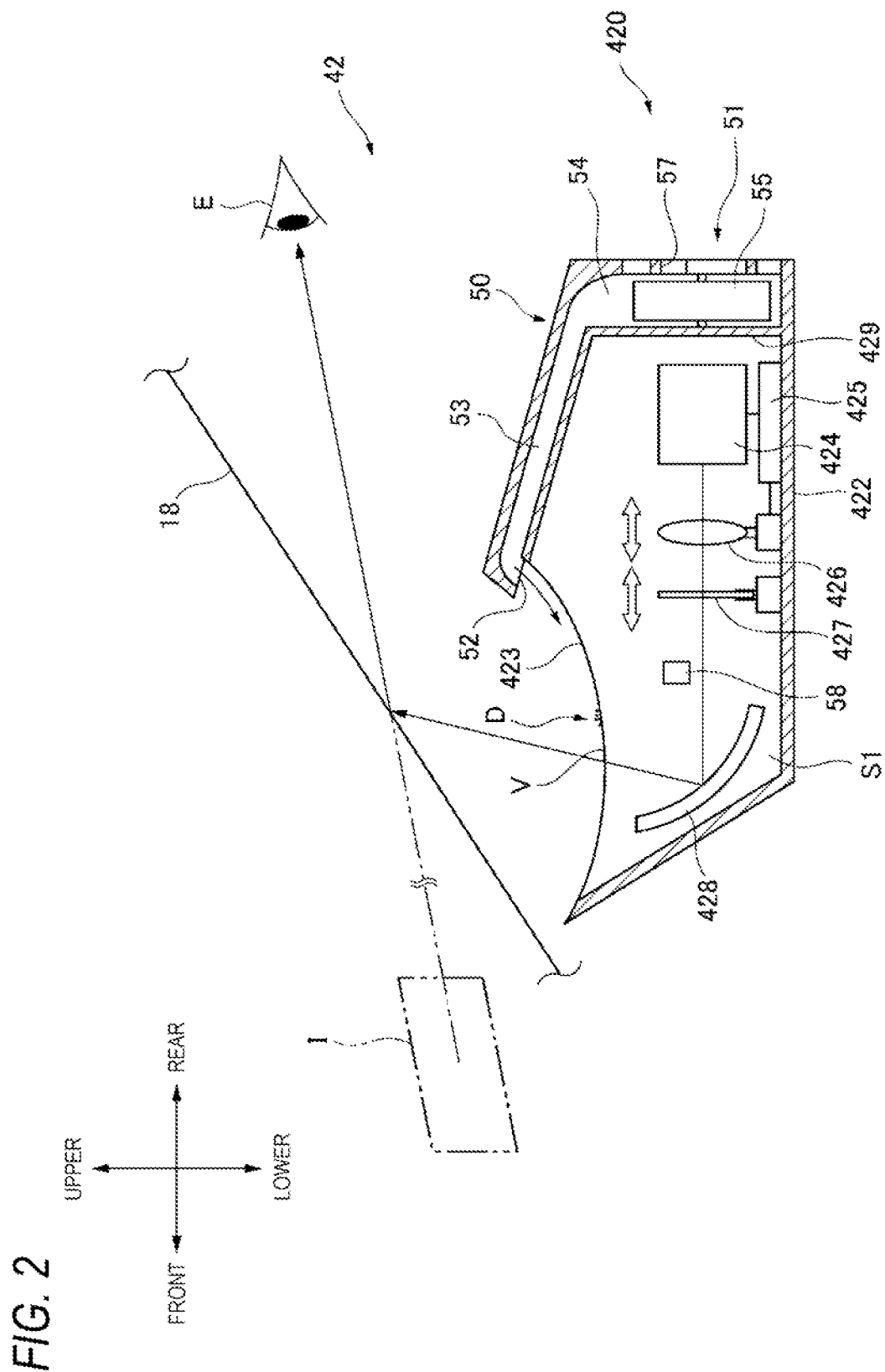
FIG. 2 is a schematic view of the HUD according to the present embodiment.

As shown in FIG. 2, the HUD 42 includes a HUD body 420. The HUD body 420 includes a housing 422 and an emission window 423. The emission window 423 is a transparent plate transmitting visible light. Inside the housing 422, the HUD body 420 includes: a picture generation unit (PGU) 424; a control circuit board (example of a control unit) 425; a lens 426; a screen 427; and a concave mirror (example of a reflection unit) 428.

The picture generation unit 424 includes a light source, an optical component, and a display device. The light source is, for example, a laser light source or an LED light source. The laser light source is, for example, an RGB laser light source configured to emit red laser light, green laser light, and blue laser light. The optical component includes: a prism; a lens; a diffusion plate; a magnifying glass; and the like, as appropriate. The display device is a liquid crystal display, a digital micromirror device (DMD), or the like. Displaying by the picture generation unit 424 may be by raster scanning, DLP, or LCOS. If DLP or LCOS is employed, the light source of the HUD 42 may be an LED light source. If a liquid crystal display system is employed, the light source of the HUD 42 may be a white LED light source.

The control circuit board 425 is configured to control operation of the picture generation unit 424, the lens 426, and the screen 427. The control circuit board 425 includes: a processor such as a central processing unit (CPU); and a memory. The processor is configured to execute a computer program loaded from the memory to control operation of the picture generation unit 424, the lens 426, and the screen 427. The control circuit board 425 generates a control signal for controlling operation of the picture generation unit 424 based on image data transmitted from the display control unit 43 and then transmit the control signal generated to the picture generation unit 424. The control circuit board 425 is configured to generate control signals each for adjusting a position of the lens 426 or the screen 427 based on image data transmitted from the display control unit 43 and then transmit each of the control signals generated to the lens 426 and the screen 427. The control circuit board 425 may configured to control a direction of the concave mirror 428.

The lens 426 is disposed on an optical path of light emitted from the picture generation unit 424. The lens 426 includes, for example, a convex lens and is configured to project an image generated by the picture generation unit 424 onto the screen 427 in desired size. The lens 426 further includes a drive unit and is configured to be translated quickly to change a distance between the picture generation unit 424 and the lens 426 in response to a control signal generated by the control circuit board 425.

The screen 427 is disposed on the optical path of the light emitted from the picture generation unit 424. The light emitted from the picture generation unit 424 passes through the lens 426 and is then projected onto the screen 427. The screen 427 includes a drive unit and is configured to be translated quickly to change a distance between the picture generation unit 424 and the screen 427 and a distance between the lens 426 and the screen 427 in response to a control signal generated by the control board 425.

The picture generation unit 424 may contain the lens 426 and the screen 427. The lens 426 and the screen 427 may not be provided.

The concave mirror 428 is disposed on the optical path of the light emitted from the picture generation unit 424. The concave mirror 428 reflects, toward the windshield 18, the light emitted by the picture generation unit 424 and then passing through the lens 426 and the screen 427. The concave mirror 428 has a reflection surface curved in a concave shape to form a virtual image and reflects a light image formed on the screen 427 at a predetermined magnification.

Light emitted from the HUD body 420 heads toward the windshield 18 (for example, a front window of the vehicle 1). Next, some of the light emitted from the HUD body 420 to the windshield 18 is reflected toward the occupant's viewpoint E. As a result, the occupant perceives the light (predetermined image) emitted from the HUD body 420 to be a virtual image formed at a predetermined distance ahead of the windshield 18. Thus, the image displayed by the HUD 42 is superimposed on the real world ahead of the vehicle 1 through the windshield 18, so that the occupant can visually recognize that a virtual image object I formed by the predetermined image is floating on a road outside the vehicle.

A distance of the virtual image object I (distance between the occupant's viewpoint E and the virtual image) can be changed by adjusting the positions of the lens 426 and the screen 427, as appropriate. When a two-dimensional image is formed as the virtual image object I, the predetermined image is projected to be a virtual image at a arbitrarily determined single distance. When a three-dimensional image is formed as the virtual image object I, a plurality of predetermined images identical to or different from each other is projected to be virtual images at distances different from each other.

The display control unit 43 is configured to control operation of the road-surface projection device 45, the head lamp 20, and the HUD 42. The display control unit 43 is configured with an electronic control unit (ECU). The electronic control unit includes: a computer system (for example, a SoC) including one or more processors and one or more memories; and an electronic circuit including an active element such as a transistor and a passive element. The processor includes at least one of a CPU, an MPU, a GPU, and a TPU. The memory includes a ROM and a RAM. The computer system may be a non-Neumann computer such as an ASIC or an FPGA.

In the present embodiment, the vehicle control unit 3 and the display control unit 43 are separately provided but may be integrated. In this case, the display control unit 43 and the vehicle control unit 3 may be a single electronic control unit. The display control unit 43 may be configured with two electronic control units constituted of: an electronic control unit configured to control operation of the head lamp 20 and the road-surface projection device 45; and an electronic control unit configured to control operation of the HUD 42. The control board 42S, configured to control the operation of the HUD 42, may be a part of the display control unit 43.

The sensor 5 includes at least one of an acceleration sensor, a speed sensor, and a gyroscope. The sensor 5 is configured to detect a traveling state of the vehicle to output traveling state information to the vehicle control unit 3. The sensor 5 may further include: a seat occupancy sensor configured to detect whether a driver sits in a driver seat; a face orientation sensor configured to detect an orientation of driver's face; an external weather sensor configured to detect external weather conditions, a human detection sensor configured to detect whether there is a person in the vehicle; and the like.

The camera 6 is, for example, a camera including an imager such as a charge-coupled device (CCD) or a complementary MOS (CMOS). The camera 6 includes one or more external cameras 6A and an internal camera 6B. The external cameras 6A are configured to acquire image data representing surroundings of the vehicle to transmit the image data to the vehicle control unit 3. The vehicle control unit 3 is configured to acquire surrounding information based on the image data transmitted. The surrounding information may include information relating to an object (a pedestrian, another vehicle, a sign, or the like) outside the vehicle. For example, the surrounding information may include: information relating to an attribute of the object outside the vehicle; and information relating to a distance and a relative position of the object to the vehicle. The external cameras 6A may be configured with monocular cameras or stereo cameras.

The internal camera 6B is disposed inside the vehicle and is configured to acquire image data indicating the occupant. The internal camera 6B functions as a tracking camera configured to track the occupant's viewpoint E. The occupant's viewpoint E may be either a viewpoint of the occupant's left eye or of the occupant's right eye. Alternatively, the viewpoint E may be defined as a midpoint of a line segment between the viewpoints of the left eye and the right eye. The display control unit 43 may determine the position of the occupant's viewpoint E based on the image data acquired by the internal camera 6B. The position of the occupant's viewpoint E may be updated at a predetermined cycle based on the image data or determined only once when the vehicle is activated.

The radar 7 includes at least one of a millimeter-wave radar, a microwave radar, and a laser radar (for example, a LiDAR unit). For example, the LiDAR unit is configured to detect surroundings of the vehicle. In particular, the LiDAR unit is configured to acquire three-dimensional mapping data (point cloud data) representing the surroundings of the vehicle to transmit the three-dimensional mapping data to the vehicle control unit 3. The vehicle control unit 3 is configured to determines the surrounding information based on the three-dimensional mapping data transmitted.

The HMI 8 includes: an input unit configured to receive input operation from the driver; and an output unit configured to output traveling information and the like to the driver. The input unit includes: a steering wheel; an accelerator pedal; a brake pedal; a driving mode switch for switching of driving mode of the vehicle; and the like. The output unit is a display (excluding the HUD) configured to display various types of traveling information. The GPS 9 is configured to acquire current position information of the vehicle to output the current position information acquired to the vehicle control unit 3.

The wireless communication unit 10 is configured to receive information (for example, traveling information) relating to another vehicle around the vehicle from that vehicle and to transmit information (for example, traveling information) on the vehicle to another vehicle (vehicle-to-vehicle communication). The wireless communication unit 10 is configured to receive infrastructure information from an infrastructure facility such as a traffic light and a traffic sign to transmit traveling information of the vehicle 1 to the infrastructure facility (vehicle-to-infrastructure communication). The wireless communication unit 10 is configured to receive information relating to a pedestrian from a portable electronic device (a smart phone, a tablet computer, a wearable device, or the like) carried by the pedestrian to transmit traveling information of the own vehicle to the portable electronic device (vehicle-to-pedestrian communication). The vehicle may communicate with another vehicle, the infrastructure facility, or the portable electronic device directly in ad-hoc mode or via an access point. The vehicle may also communicate with another vehicle, the infrastructure facility, or the portable electronic device via a communication network (not shown). The communication network includes at least one of the Internet, a local area network (LAN), a wide area network (WAN), and a radio access network (RAN). A wireless communication standard is, for example, Wi-Fi (registered trademark), Bluetooth (registered trademark), ZigBee (registered trademark), LPWA, DSRC (registered trademark), or Li-Fi. The vehicle 1 may communicate with another vehicle, the infrastructure facility, or the portable electronic device using the fifth generation mobile communication system (5G).

The storage device 11 is an external storage device such as a hard disk drive (HDD) and a solid-state drive (SSD). The storage device 11 may store two-dimensional or three-dimensional map information and/or a vehicle control program. For example, the three-dimensional map information may be three-dimensional mapping data (point cloud data). The storage device 11 is configured to output the map information and the vehicle control program to the vehicle control unit 3 in response to a request from the vehicle control unit 3. The map information and the vehicle control program may be updated via the wireless communication unit 10 and the communication network.

When the vehicle travels in the self-driving mode, the vehicle control unit 3 automatically generates at least one of a steering control signal, an accelerator control signal, and a brake control signal based on the traveling state information, the surrounding environment information, the current position information, the map information, and the like. The steering actuator 12 is configured to receive a steering control signal from the vehicle control unit 3 to control the steering device 13 based on the steering control signal received. The brake actuator 14 is configured to receive a brake control signal from the vehicle control unit 3 to control the brake device 15 based on the brake control signal received. The accelerator actuator 16 is configured to receive an accelerator control signal from the vehicle control unit 3 to control the accelerator device 17 based on the accelerator control signal received. In this way, the vehicle control unit 3 automatically controls traveling of the vehicle based on the traveling state information, the surrounding information, the current position information, the map information, and the like. That is, in the self-driving mode, traveling of the vehicle is automatically controlled by the vehicular system 2.

On the other hand, when the vehicle 1 travels in manual driving mode, the vehicle control unit 3 generates the steering control signal, the accelerator control signal, and the brake control signal according to driver's manual operation on the accelerator pedal, the brake pedal, and the steering wheel. In this way, in the manual driving mode, the steering control signal, the accelerator control signal, and the brake control signal are generated according to driver's manual operation, so that traveling of the vehicle is controlled by the driver.

Next, some driving mode of the vehicle will be described. The driving mode is the self-driving mode and the manual driving mode. The self-driving mode is constituted of full automation mode, advanced driver assistance mode, and driver assistance mode. In the full automation mode, the vehicular system 2 automatically performs all of steering control, brake control, and accelerator control so that the driver cannot drive the vehicle. In the advanced driver assistance mode, the vehicular system 2 automatically performs all of the steering control, the brake control, and the accelerator control so that the driver does not drive the vehicle but can drive the vehicle 1. In the driver assistance mode, the vehicular system 2 automatically performs some of the steering control, the brake control, and the accelerator control so that the driver drives the vehicle with driving assistance of the vehicular system 2. On the other hand, in the manual driving mode, the vehicular system 2 does not automatically perform traveling control so that the driver drives the vehicle without the driving assistance of the vehicular system 2.

In this way, the HUD 42 of the present embodiment is provided in the vehicle 1 and is configured to display a predetermined image to the occupant of the vehicle 1. The HUD 42 includes: the housing 422 having an opening upward; the emission window 423 (transparent cover) covering the opening of the housing 422; the picture generation unit 424 provided inside an image formation chamber S1 (accommodation portion) formed with the housing 422 and the emission window 423 to emit light for generating a predetermined image; and the reflection unit 428 reflecting light so that light emitted by the picture generation unit 424 heads toward the windshield 18.

Figure 3:
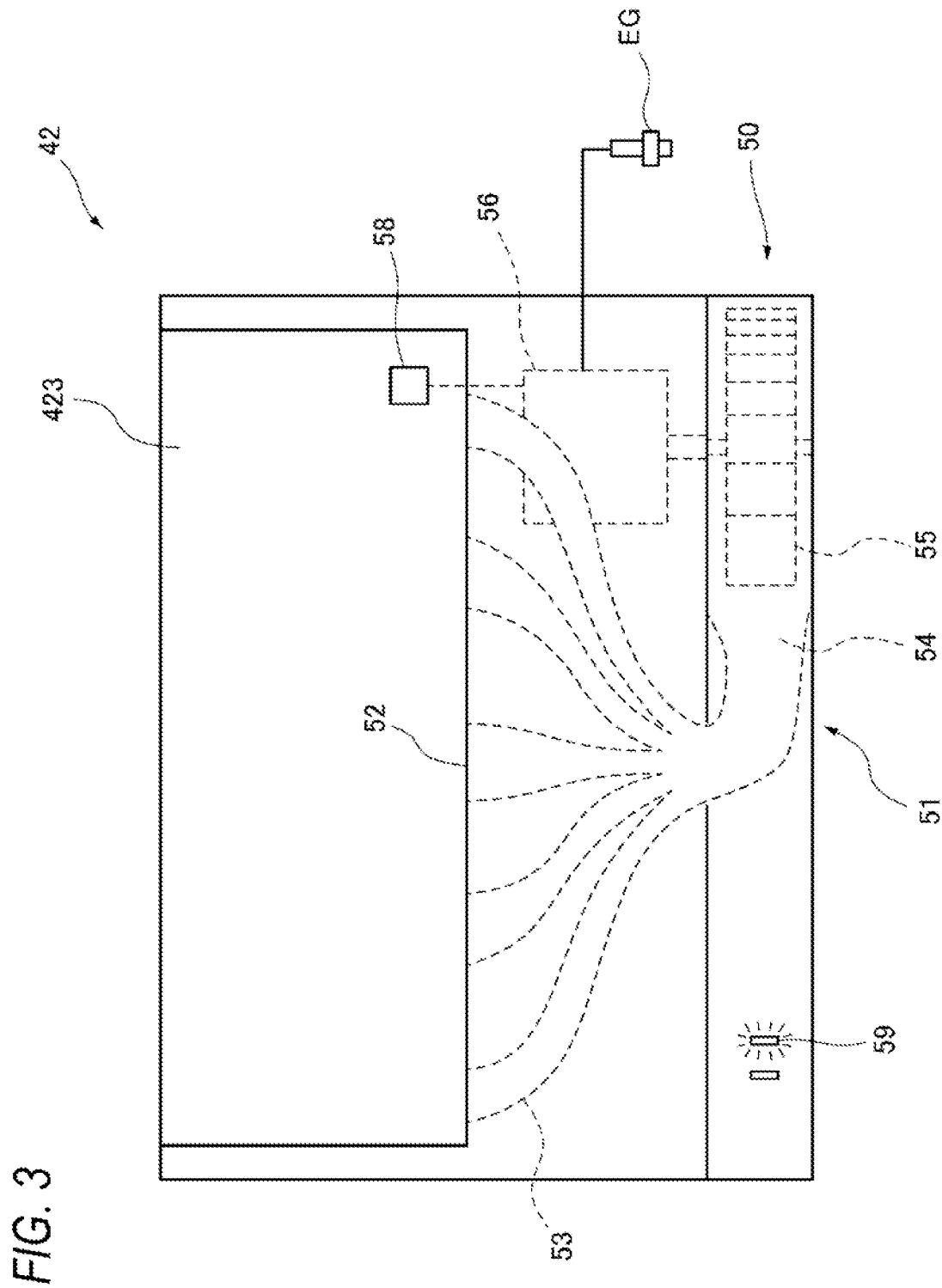
FIG. 3 is a top view of the HUD.

The HUD 42 of the present embodiment further includes a cleaner 50 configured to clean an outer surface of the emission window 423. The cleaner 50 will be described with reference to FIGS. 2 and 3. In FIG. 2, the windshield 18 is in the side, and driver's seat is in the right side. FIG. 3 is a top view of the HUD 42.

The cleaner 50 of the present embodiment is an air-blowing mechanism configured to blow air to the outer surface of the emission window 423. The cleaner 50 of the present embodiment is an air blower configured to blow air continuously. The cleaner 50 includes an air-blowing device 51, a nozzle 52, and an air-guiding pipe 53. The air-blowing device 51 includes: a rectification unit 54, an impeller 55, and a motor 56. An airflow generated by the air-blowing device 51 is guided to the nozzle 52 through the air-guiding pipe 53, and then air is blown from the nozzle 52 to the outer surface of the emission window 423.

The air-blowing device 51 is provided inside the housing 422. The rectification unit 54 is separated by a wall 429 from the image formation chamber S1, in which the picture generation unit 424, the concave mirror 428, and the like are provided. The rectification unit 54 is provided with the impeller 55 and a rotation shaft portion. A wall of the housing 422 separating the rectification unit 54 from the outside is provided with an intake port 57 from which air from the outside is taken in to the rectification unit 54.

The impeller 55 is rotatably supported by the rectification unit 54. The rotation shaft portion of the impeller 55 is supported by the wall of the housing 422. The rotation shaft portion of the impeller 55 is coupled to an output shaft of the motor 56. When the motor 56 is driven, the impeller 55 rotates. Air flows away from the rotation shaft portion by a centrifugal force produced by the impeller 55, and air pressed against the rectification unit 54 is rectified along an inner wall of the rectification unit 54, and air rectified is discharged from the nozzle 52 through the air-guiding pipe 53. New air flows into the rectification unit 54 from the intake port 57.

Since the HUD 42 emits light toward the windshield 18 from underneath, the outer surface of the emission window 423 faces upward. For this reason, dirt such as dust is apt to lie on the outer surface of the emission window 423. Further, the emission window 423 faces a narrow space between the windshield 18, far from driver's seat, and the dashboard of the vehicle 1. For this reason, an airflow is not produced easily around the emission window 423, so that dirt is apt to lie.

Moreover, the emission window 423 is usually provided near the windshield 18, that is, far from driver's seat, so that it is difficult for the occupant to notice that dirt lies on the emission window 423. Furthermore, the emission window 423 is far from driver's seat, so that the occupant does not easily feel like cleaning the emission window 423.

If dirt remains lying on the emission window 423, light reflected by the concave mirror 428 is blocked or diffused by the dirt on the emission window 423, so that light cannot be displayed on the windshield 18 at a desired light intensity.

The inventors found that dirt is apt to lie on the emission window 423 of the HUD 42 and there are few chances to remove the lying dirt. Therefore, the inventors conceived of providing, in the HUD 42, the cleaner 50 configured to clean the outer surface of the emission window 423. Since the cleaner 50 is provided in the HUD 42, dirt can be removed by actuating the cleaner 50, thereby a desired image can be continuously displayed on the windshield 18 at a desired light intensity.

In the present embodiment, the cleaner 50 is an air-blowing mechanism configured to blow air to the outer surface of the emission window 423. Besides the air-blowing mechanism, as a cleaner 50, a mechanism is known that is configured to remove dirt by touching dirt such as a brush and a wiper. However, the brush and the wiper are suitable for removing a relatively heavy foreign object such as mud and water, while what lies on the emission window 423 is a relatively light foreign object such as dust. Since suitable for removing a light foreign object, the air-blowing mechanism is suitable to be mounted on the HUD 42.

The cleaner 50 may be a non-positive displacement and one or a positive displacement fan configured to blow air as in the above-described embodiment. Alternatively, the cleaner 50 may be a fan configured to blow air continuously at a constant rate as in the above-described embodiment or a mechanism configured to blow high-pressure air to the emission window 423 arbitrarily. Further, the cleaner 50 may also be a mechanism including a brush, a wiper, or the like to remove dirt on the outer surface of the emission window 423 by touching the dirt.

In the present embodiment, the cleaner 50 is configured to blow air to the outer surface of the emission window 423 from the driver's seat side toward the windshield 18 side. Dust is less likely to be transported to the driver's seat side by air blown from the cleaner 50.

In the present embodiment, the emission window 423 has a concave shape in which a valley portion V is provided between the driver's seat side and the windshield 18 side. The cleaner 50 is configured to blow air toward the valley portion V.

Dirt is apt to lie on the valley portion V. The valley portion V is an area of the emission window 423 that is usually located between the driver's seat side and the windshield 18 side and through which light reflected by the concave mirror 428 usually passes. Since the cleaner 50 blows air toward such a valley portion V, it is easier to maintain good displaying by the HUD 42 more effectively.

In the present embodiment, the cleaner 50 includes: a plurality of nozzles 52; the air-blowing device 51 configured to blow air from the nozzles 52; and the air-guiding pipe 53 connecting the air-blowing device 51 and the plurality of nozzles 52.

The windshield 18 has a flat rectangular shape in which the dimension of the windshield 18 in the left-right direction of the vehicle 1 is larger than that in the height direction of the vehicle 1. In order to emit light toward the windshield 18, the emission window 423 of the HUD 42 usually has a flat rectangular shape in which the dimension of the emission window 423 in the left-right direction of the vehicle 1 is larger than that in the front-rear direction of the vehicle 1.

As shown in FIG. 3, in the present embodiment, the plurality of nozzles 52 is provided along the left-right direction of the vehicle 1 in accordance with the shape of the emission window 423. Since air is blown toward the plurality of nozzles 52 by the single air-blowing device 51, the emission window 423 can be cleaned throughout, while the HUD 42 is prevented from increasing in size.

In the present embodiment, the cleaner 50 is actuated when a power source of the vehicle 1 is turned on.

As shown in FIG. 3, the motor 56 of the cleaner 50 is connected to an ignition switch EG of the vehicle 1. The cleaner 50 is actuated when the ignition switch EG of the vehicle is turned on.

The HUD 42 is usually disposed far from driver's seat, so that it is difficult for the occupant to notice that dirt lies on the emission window 423. With a configuration in which the cleaner 50 is actuated when the power source of the vehicle 1 is turned on, the emission window 423 can be cleaned at a start of driving the vehicle 1 even if the occupant does not bother to operate the cleaner 50.

The cleaner 50 may continue to run until the ignition switch EG is turned off after the ignition switch EG was turned on. Alternatively, the cleaner 50 may be turned off when a predetermined time has elapsed since the ignition switch EG was turned on.

The cleaner 50 may be turned on at the same time as the ignition switch EG is turned on or after a predetermined time has elapsed since the ignition switch EG was turned on. The cleaner 50 may also be turned on again after a predetermined time has elapsed since the cleaner 50 was turned on.

The cleaner 50 may be provided inside the housing 422 and is configured to be actuated according to output from a dirt sensor 58 configured to determine a degree of dirt on the emission window 423 based on reflection of light emitted from the concave mirror 428 (reflection unit) at the emission window 423.

As shown in FIG. 2, the dirt sensor 58 is provided inside the image formation chamber S1 of the housing 422. The dirt sensor 58 is an optical sensor. If dirt lies on the emission window 423, the light emitted from the concave mirror 428 is reflected by the dirt. That is, as an amount of laying dirt increases, light intensity of the reflected light from the emission window 423 increases. The dirt sensor 58 is configured to determine the light intensity of the reflected light from the emission window 423 to output an electric signal according to the light intensity. Thus, the degree of laying dirt can be estimated. Accordingly, in the cleaner 50, the motor 56 is turned on according to the output of the dirt sensor 58. Specifically, the motor 56 is turned on when the output from the dirt sensor 58 exceeds a predetermined value.

In this case, not running always, the cleaner 50 can be actuated when the degree of dirt is large. For example, if an air blower is employed as the air-blowing mechanism as in the above-described embodiment, the occupant may feel an operation sound of the air blower noisy. Since the cleaner 50 is actuated only when the degree of dirt is large, it is possible to reduce occupant's mental burden.

Further, an indicator 59 (notification unit) may be actuated when a signal indicating that the emission window 423 is dirtier than a predetermined degree is acquired from the dirt sensor 58 even after the cleaner 50 was actuated.

As shown in FIG. 3, when the output of the dirt sensor 58 exceeds a predetermined value even after the cleaner 50 was actuated, the indicator 59, provided in the cleaner 50, may be turned on. If dirt adheres to the emission window 423, the dirt may not be removed even by the cleaner 50. In this case, the occupant is notified that the dirt cannot be removed and the emission window 423 is dirty.

Although the reflection unit includes only the concave mirror 428 in the above-described embodiment, the reflection unit may include the concave mirror 428 and a plane mirror so that light emitted from the picture generation unit 424 is reflected by the plane mirror after passing through the lens 426 and the screen 427, and light reflected by the plane mirror enters the concave mirror 428. In this case, the optical path can be designed more flexibly, thereby the HUD 42 being compact easily.

Second Embodiment

When sunlight enters the head-up display of Patent Literature 1, the sunlight converges on a picture generation unit through a concave mirror. Then, heat is generated in the picture generation unit, so that the picture generation unit may be degraded.

Accordingly, the second embodiment of the present invention provides a head-up display that can prevent a picture generation unit from being degraded.

A head-up display according to this embodiment,
  a head-up display that is provided in a vehicle and is configured to display a predetermined image to an occupant of the vehicle includes:
  a picture generation unit that is configured to emit light for generating the predetermined image;
  a reflection unit that reflects light emitted by the picture generation unit to a windshield and includes at least a concave mirror; and
  a shade unit that is capable of blocking light from entering the picture generation unit, wherein
  the shade portion is movable between:
    a closed position in which an optical path between the picture generation unit and the concave mirror is blocked; and an open position in which the optical path between the picture generation unit and the concave mirror is not blocked.

The configuration of the head-up display of this embodiment is basically the same as that of the first embodiment described above. Therefore, similar components are denoted by the same reference numerals, and detailed descriptions thereof will be omitted.

A HUD 42 of this embodiment is provided in a vehicle 1 and is configured to display a predetermined image to an occupant of the vehicle 1. The HUD 42 includes: an picture generation unit including: a housing 422 having an opening upward; an emission window 423 (transparent cover) covering the opening of the housing 422; the picture generation unit 424 provided inside an image formation chamber S1 (accommodation portion) formed with the housing 422 and the emission window 423 to emit light for generating a predetermined image; and a reflection unit 428 reflecting light so that light emitted by the picture generation unit 424 heads to a windshield 18.

Figure 4:
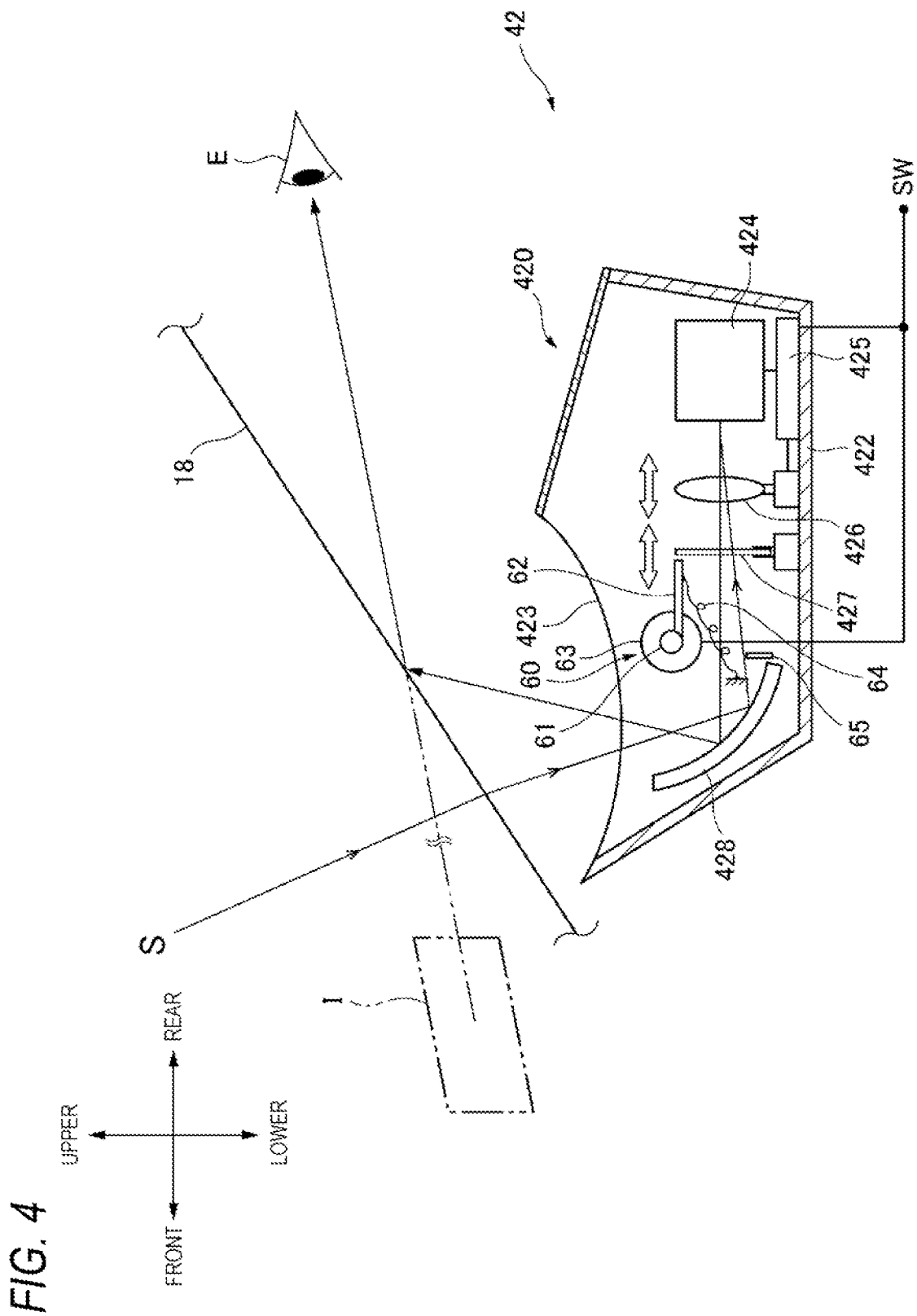
FIG. 4 is a schematic view of a HUD according to a second embodiment.
Figure 5:
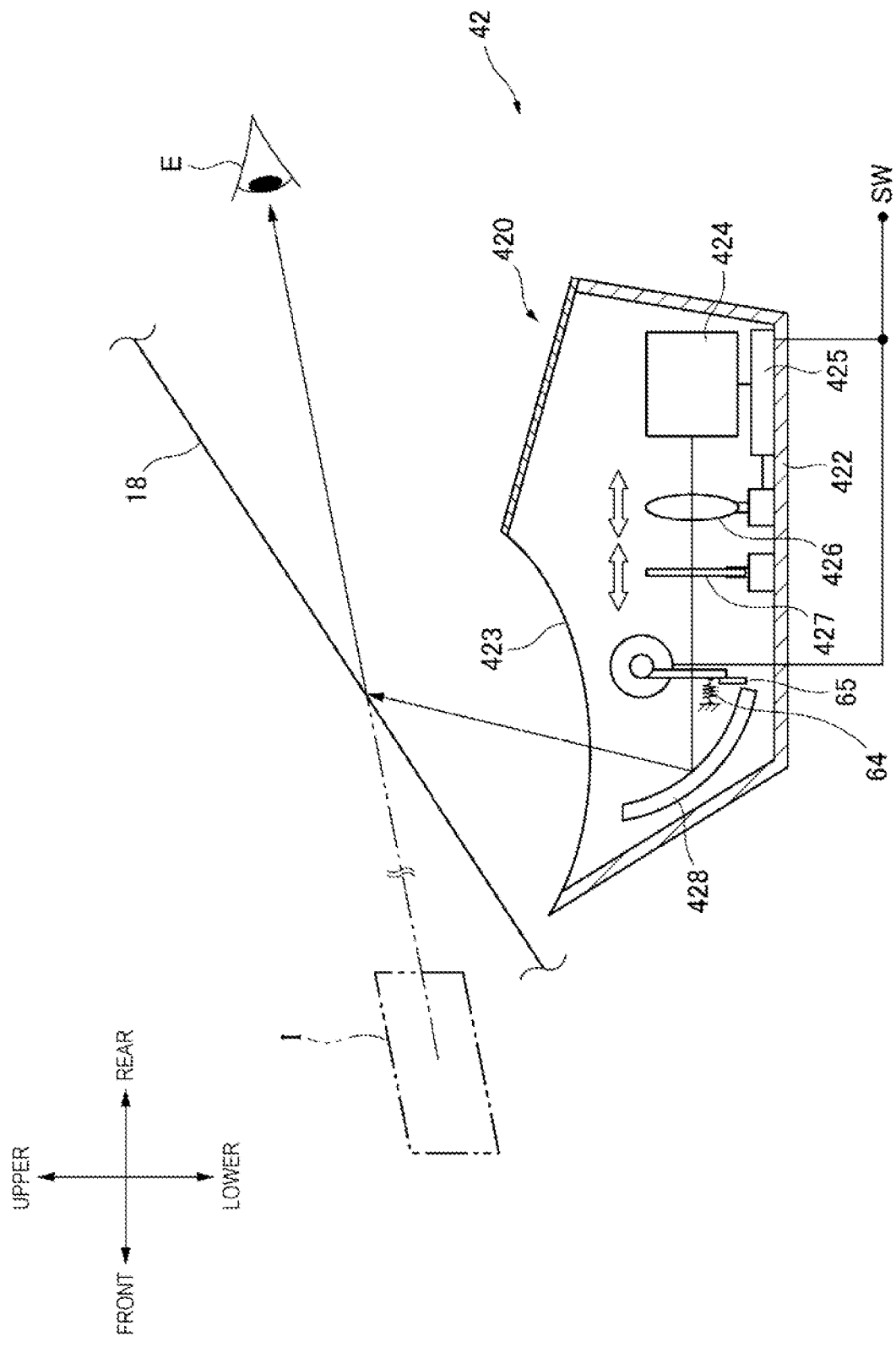
FIG. 5 is a view similar to FIG. 4 showing a cover member in a closed state.

The HUD 42 of this embodiment further includes a cover member 60. The cover member 60 includes a shade portion 62 capable of blocking light from heading into the picture generation unit 424. The cover member 60 will be described with reference to FIGS. 4 and 5. FIG. 4 shows the shade portion 62 in an open position. FIG. 5 is a view similar to FIG. 4 showing the shade portion 62 in a closed position.

The cover member 60 of this embodiment includes: a rotation shaft portion 61; the shade portion 62; and a motor 63. The rotation shaft portion 61 is connected to an output shaft of the motor 63. The rotation shaft portion 61 is an elongated portion extending in the left-right direction of the vehicle 1 (direction perpendicular to the paper surface in FIG. 4). The shade portion 62 is a plate-shaped portion. One end of the shade portion 62 is fixed to the rotation shaft portion 61, and the shade portion 62 extends in a radial direction of the rotation shaft portion 61. In this embodiment, the shade portion 62 is provided between the concave mirror 428 and a screen 427.

The shade portion 62 of this embodiment is movable, by rotating the rotation shaft portion 61 by the motor 63, to the closed position (position shown in FIG. 5), in which a light path between the picture generation unit 424 and the concave mirror 428 is blocked, and the open position (position shown in FIG. 4), in which the light path between the picture generation unit 424 and the concave mirror 428 is not blocked.

As indicated by a line S of FIG. 4, sunlight may enter the HUD 42. At this time, the sunlight enters from the emission window 423, converges on the concave mirror 428, is reflected by the concave mirror 428, and enters the picture generation unit 424 through the screen 427 and the lens 426. The picture generation unit 424 includes: a liquid crystal element; a light-emitting element; a DMD element; or the like. These elements are apt to be degraded by heat. For this reason, when sunlight impinges on the elements of the picture generation unit 424, the picture generation unit 424 may be degraded. In particular, since converged by the concave mirror 428, sunlight is likely to enter the picture generation unit 424 with high energy density to generate heat in the picture generation unit 424.

According to the HUD 42 of this embodiment, the shade portion 62 is movable between the closed position and the open position. For this reason, by moving the shade portion 62 to the closed position when sunlight enters the picture generation unit 424, it is possible to prevent the sunlight from entering the picture generation unit 424 to prevent the picture generation unit 424 from being heated by the sunlight.

The shade portion 62 is provided inside the housing 422. In order to make the shade portion 62 movable between the open position and the closed position, it is necessary to ensure a large moving range inside the housing 422 for the shade portion 62. However, the shade portion 62 of this embodiment is located between the picture generation unit 424 and the concave mirror 428. Since sunlight reflected by the concave mirror 428 converges, an area required to block the sunlight by providing the shade portion 62 in this position is reduced. The sunlight can be efficiently blocked by a small shade portion 62, and thus the moving range for the shade portion 62 can also be reduced. For this reason, even when the cover member 60 is provided inside the housing 422, it is possible to prevent the HUD 42 from increasing in size.

In this way, according to the HUD 42 of this embodiment, the HUD 42 is prevented from increasing in size, and the picture generation unit is prevented from being heated by sunlight.

In this embodiment, the shade portion 62 is configured to move to the closed position when a power source of the HUD 42 is turned off and to the open position when the power source of the HUD 42 is turned on.

As shown in FIG. 4, in this embodiment, the motor 63 is connected to a power switch SW of the HUD 42. The shade portion 62 is connected to one end of a coil spring 64. The other end of the coil spring 64 is fixed to an inner wall of the housing 422. When the motor 63 is energized, the shade portion 62 rotates in the counterclockwise direction against the restoring force of the coil spring 64 to move to the open position. When energization of the motor 63 is stopped, the shade portion 62 rotates in the clockwise direction by the restoring force of the coil spring 64 to move to the closed position, a stopper 65 fixed to the housing 422 preventing the shade portion 62 from rotating in the clockwise direction.

In this way, in the HUD 42 of this embodiment, since sunlight is prevented from entering the picture generation unit 424 when the power source of the HUD 42 is turned off, the picture generation unit 424 is prevented from being heated by the sunlight when the HUD 42, or the vehicle is not in use. The shade portion 62 is moved to the open position when the HUD 42 is in use, so that use of the HUD 42 is not hindered.

According to the HUD 42 of this embodiment, since the closed position can be maintained by the coil spring 64 and the stopper 65, the closed position can be maintained without consuming energy when the HUD 42 is not in use.

Figure 6:
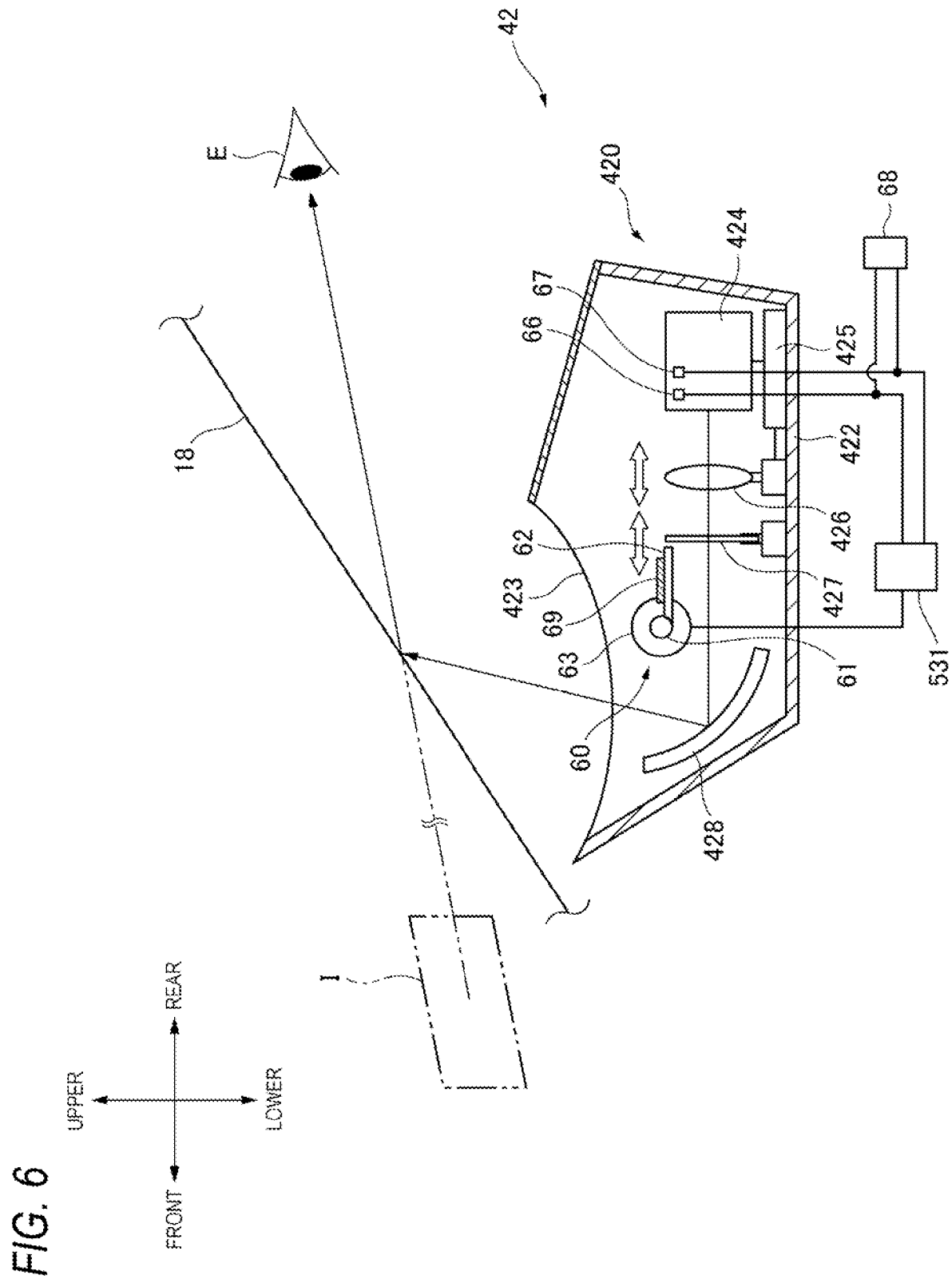
FIG. 6 is a view similar to FIG. 4 showing a HUD according to a modification of the second embodiment.

FIG. 6 is a view similar to FIG. 4 showing a HUD 42 according to a modification of the present invention.

As shown in FIG. 6, a shade portion 62 is configured to move to the closed position or the open position according to output of a temperature sensor 66 configured to measure a temperature of the picture generation unit 424 or an optical sensor 67 configured to measure an intensity of sunlight or light emitted from the picture generation unit 424.

As shown in FIG. 6, the temperature sensor 66 and the optical sensor 67 can be provided inside the picture generation unit 424 or the housing 422. The motor 63 is connected to a motor control unit 531. The motor 63 is controlled by the motor control unit 531. The motor control unit 531 may be configured to drive the motor 63 according to output of the temperature sensor 66 or the optical sensor 67. In this case, when light whose intensity is more than a predetermined value enters the picture generation unit 424 to heat the picture generation unit 424 or when the temperature of the picture generation unit 424 reaches a predetermined value, it is possible to prevent sunlight from further entering the picture generation unit 424.

In this case, it is preferable that a notification unit 68 be actuated when the shade portion 62 is in the closed position. The notification unit 68 is configured to notify that the HUD 42 is not available. In an example shown in FIG. 6, the notification unit 68 is an indicator. By turning the indicator 68 on, it is notified that the HUD 42 is not available.

When the shade portion 62 is moved to the closed position, it is not preferable that the HUD 42 be actuated since sunlight enters the picture generation unit 424 if the HUD 42 is actuated. According to the HUD 42 of this modification, the notification unit 68 can notify the occupant that the HUD 42 is not available.

In this modification, the shade portion 62 is provided with a phosphorescent member 69. When the shade portion 62 is in the closed position, converged sunlight enters the phosphorescent member 69. For this reason, the phosphorescent member 69 can absorb light energy efficiently. The phosphorescent member 69 can emit light to heighten decorativeness of the HUD 42 when the shade portion 62 is in the open position. Instead of or in addition to the phosphorescent member 69, a solar cell may be provided on the shade portion 62.

In this modification, it is preferable that the shade portion 62 provided with the phosphorescent member 69 and/or the solar cell be provided to be closer to the picture generation unit 424 than the concave mirror 428. As the shade portion 62 is farther away from the concave mirror 428, sunlight converges more. When provided to be closer to the picture generation unit 424 than the concave mirror 428, the phosphorescent member 69 and/or the solar cell can receive sunlight converged more.

the reflection unit includes only the concave mirror 428 in the above-described embodiment, the reflection unit may include the concave mirror 428 and a plane mirror so that light emitted from the picture generation unit 424 is reflected by the plane mirror after passing through the lens 426 and the screen 427, and light reflected by the plane mirror enters the concave mirror 428. In this case, an optical path can be designed more flexibly, thereby the HUD 42 being compact easily.

Although a configuration has been described in which the shade portion is translated to the open position or the closed position by rotation, the present invention is not limited thereto. The shade portion can be a plate-shaped member configured to be translated to the open position or the closed position. Alternatively, the shade portion may be a member configured to be folded when the shade portion is in the open position to be unfolded when the shade portion is in the closed position.

Although a configuration in which light emitted from the picture generation unit is reflected by the reflection unit to head toward the windshield has been described, the present invention is not limited thereto. A configuration may be employed in which light emitted from the picture generation unit is reflected by the reflection unit to head toward a combiner different from the windshield. Even in the configuration in which an image is displayed by the combiner, sunlight may be converged by the reflection unit to enter the picture generation unit as described above. According to the present invention, the picture generation unit can be protected by the shade portion.

Third Embodiment

The third embodiment of the present invention provides a vehicular head-up display system providing useful information.

The configuration of the head-up display of this embodiment is basically the same as that of the head-up display of the first embodiment described above. Therefore, similar components are denoted by the same reference numerals, and detailed descriptions thereof will be omitted.

Figure 7:
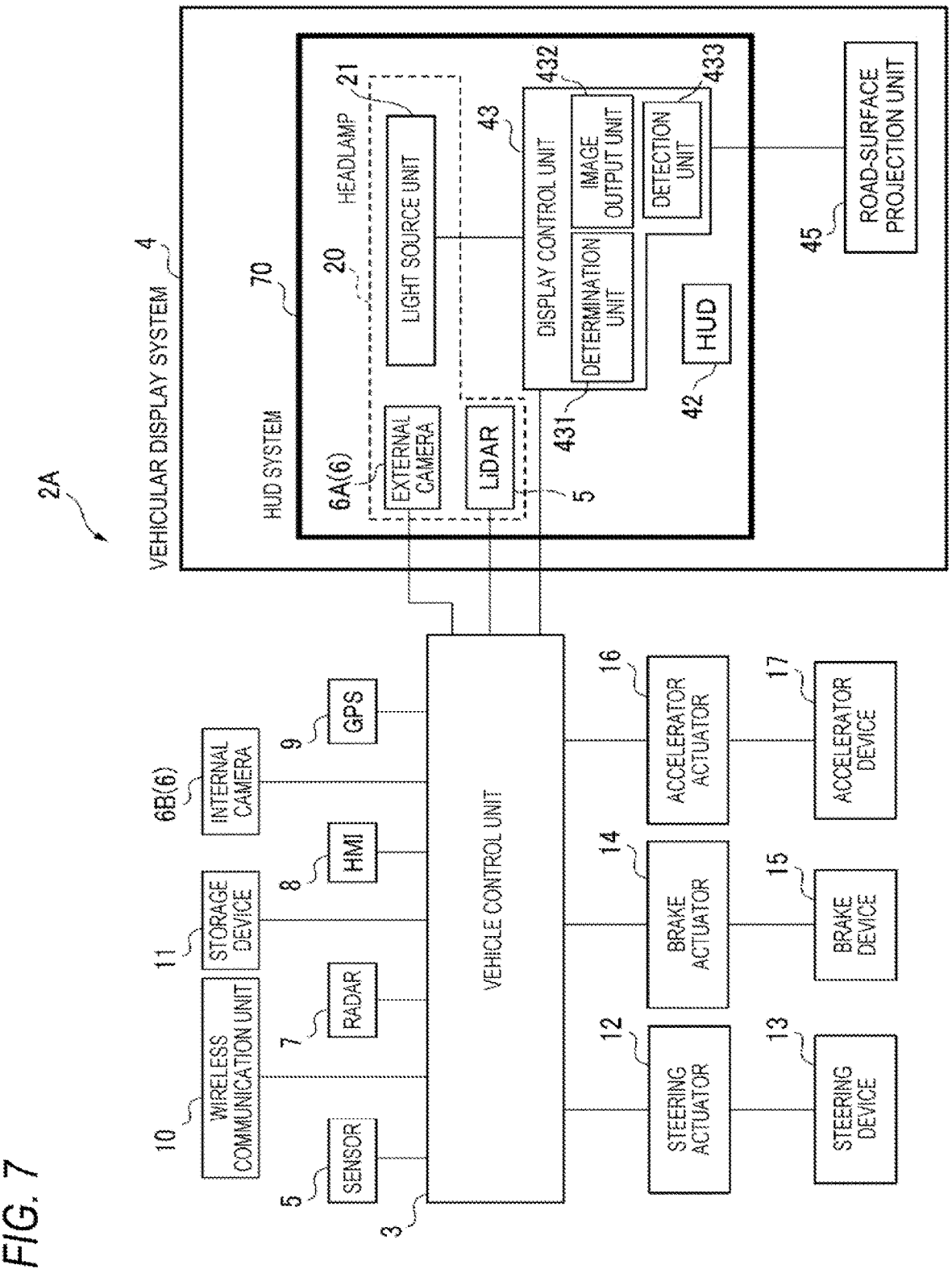
FIG. 7 is a block diagram of a vehicular system including a HUD system according to a third embodiment of the present invention.

FIG. 7 is a block diagram of a vehicular system 2A including a HUD system 70 according to this embodiment. As shown in FIG. 7, the HUD system 70 according to this embodiment includes: a headlamp 20 including a light source unit 21, LiDAR 5, and a camera 6; a HUD 42; and the display control unit 43.

Figure 8:
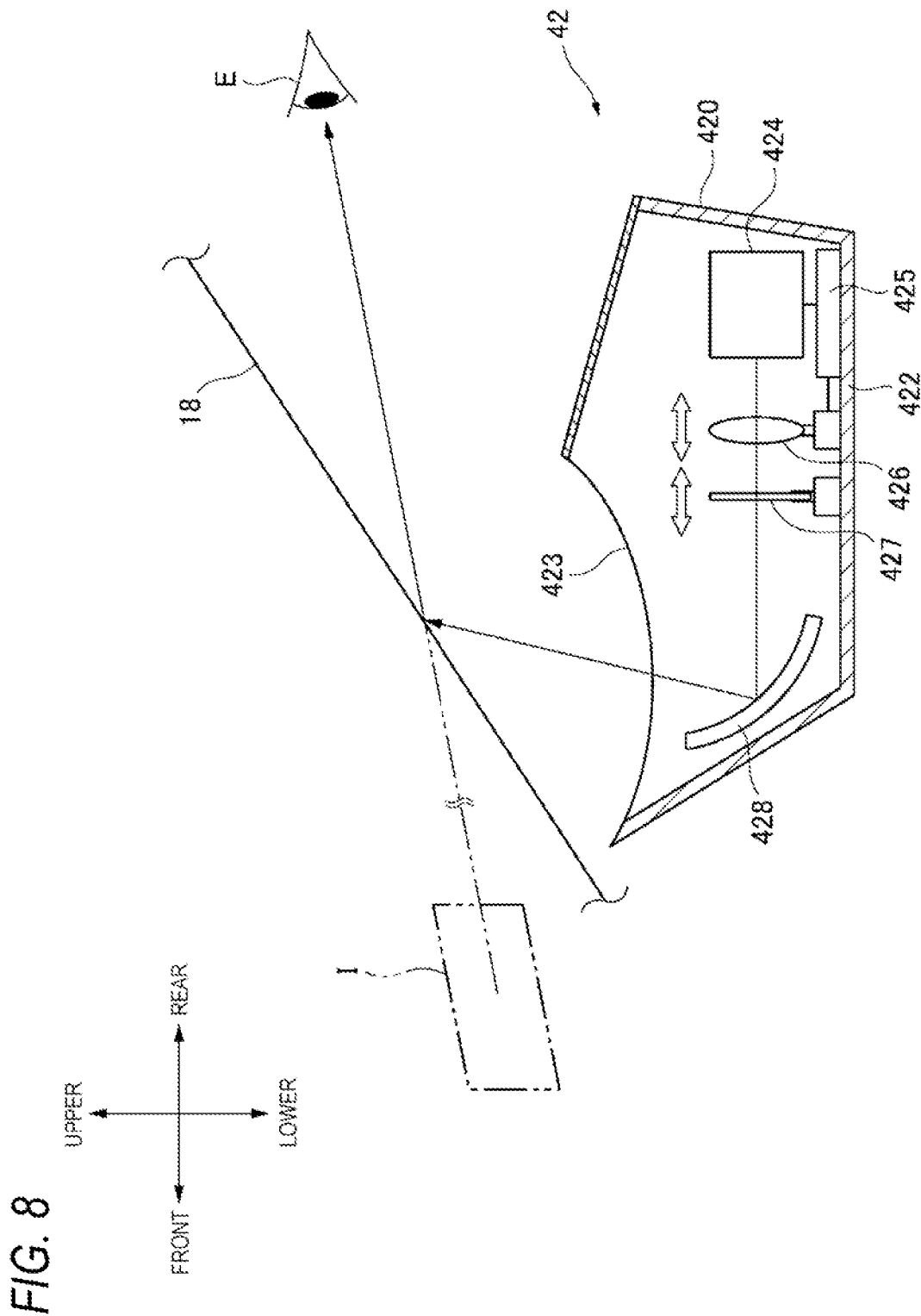
FIG. 8 is a schematic view of a HUD according to the third embodiment.

FIG. 8 is a schematic view of the HUD 42 according to this embodiment. As shown in FIG. 8, the HUD 42 of this embodiment is provided in a vehicle 1 and is configured to display a predetermined image to an occupant of the vehicle 1. The HUD 42 includes: a housing 422 having an opening upward; an emission window 423 (transparent cover) covering the opening of the housing 422; a picture generation unit 424 provided inside an image formation chamber S1 (accommodation portion) formed with the housing 422 and the emission window 423 to emit light for generating a predetermined image; and a reflection unit 428 reflecting light so that the light emitted by the picture generation unit 424 heads toward the windshield 18.

Figure 9:
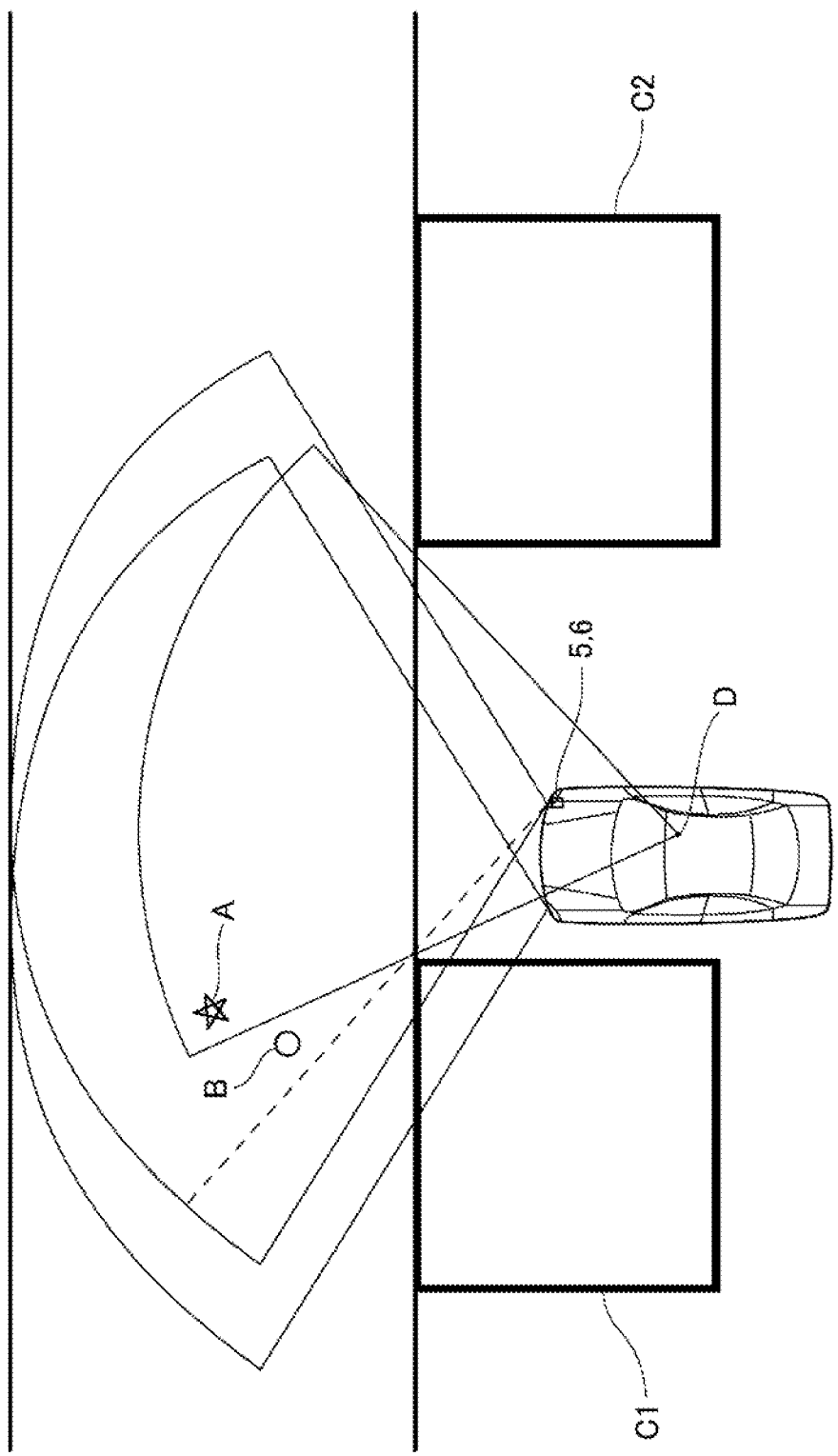
FIG. 9 shows a situation as viewed from above in which a vehicle is about to enter a road in front from between two buildings.

FIG. 9 shows a situation as viewed from above in which the vehicle 1 is about to enter a road in front from between two buildings. As shown in FIG. 9, the sensor 5 and the camera 6 are provided in positions different from driver's seat. In this embodiment, the LiDAR 5 and the camera 6 are provided in the headlamp 20. In this way, since the LiDAR 5 and the camera 6 are provided in the positions different from driver's seat, sight of the LiDAR 5 and the camera 6 is different from driver's sight. For this reason, as shown in FIG. 9, an object A is visually recognized by the LiDAR 5, the camera 6, and the driver, while an object B is visually recognized by the LiDAR 5 and the camera 6 but not by the driver.

Specifically, the head lamp 20 is provided anteriorly to driver's seat. Therefore, the LiDAR 5 and the camera 6 can recognize the object B without being blocked by a building C1, while, blocked by the building C1, the object B cannot be recognized by the driver.

Figure 10:
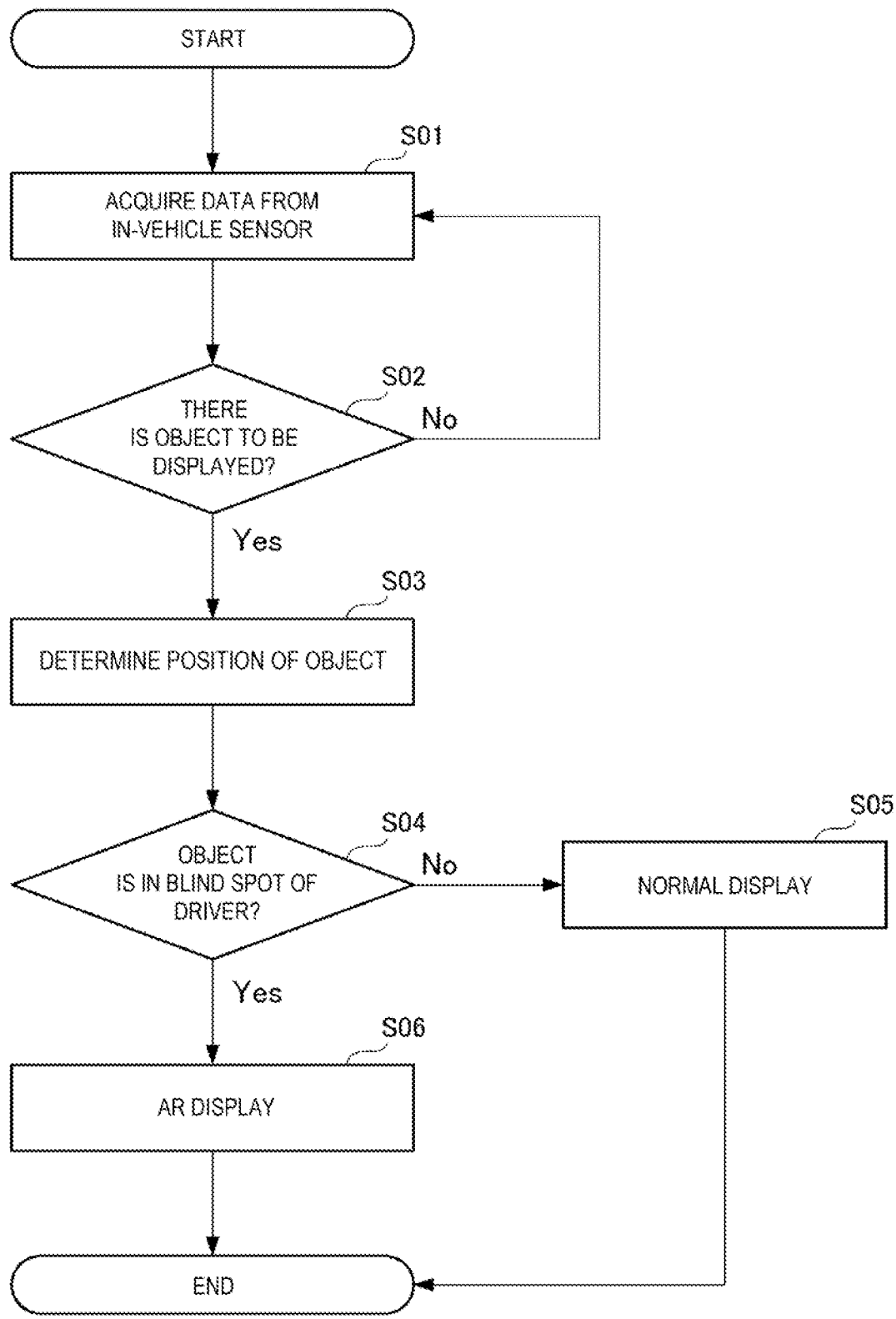
FIG. 10 is a flowchart executed by the HUD system.

According to the HUD system 70 of this embodiment, by executing processing shown in FIG. 10, the HUD 42 displays the object B, which cannot be recognized by the driver, so that it is possible to notify the driver of the object B. FIG. 10 is a flowchart executed by the display control unit 43 configured to control the HUD 42 according to this embodiment. The processing shown in FIG. 10 can be executed in the situation shown in FIG. 9. The processing shown in FIG. 10 is executed by the display control unit 43. The display control unit 43 includes, in particular, a determination unit 431 configured to execute step S04 as will be described later and an image output unit 432 configured to execute step S06 (see FIG. 7).

First, the display control unit 43 acquires sensed data from the LiDAR 5 and the camera 6 (step S01). Next, the display control unit 43 determines whether there is an object to be displayed by the HUD 42 based on data acquired from the LiDAR 5 and the camera 6 (step S02). The object to be displayed is one to which the driver should pay attention such as a pedestrian, a bicycle, a vehicle, or the like. In the following, the object to be displayed is referred to as an object. When it is determined that there is no object (No in step S02), the display control unit 43 returns to step S01 again.

When it is determined that there is an object (Yes in step S02), the display control unit 43 determines a position of the object based on the data acquired from the LiDAR 5 and the camera 6 (step S03). For example, the output of the LiDAR 5 includes data on an azimuth, a solid angle, and a distance of the detection object. For this reason, the position of the object can be determined based on the output of the LiDAR 5. Alternatively, if the camera 6 is a stereo camera including imagers provided in two different positions, the position of the object can be determined by comparing images from both imagers.

Next, the display control unit 43 determines whether the object is in driver's blind spot (step S04). Precisely speaking, driver's blind spot is an area defined with the driver's eyes the origin. However, in this embodiment, driver's blind spot is defined with a virtual point at a predetermined distance ahead of a center position of a headrest of the driver seat the origin. In this way, the display control unit 43 can treat driver's blind spot as an area extending from a fixed point regardless of change in a height of the driver's head or an orientation of the driver's face. In this embodiment, information on the origin of driver's blind spot is a fixed value readably recorded in a memory.

When there is no obstacle ahead, driver's blind spot is determined based on this virtual origin and a structure of the vehicle 1 such as A pillars of the vehicle 1. When the display control unit 43 determines that there is an obstacle ahead such as a building, a fence, a tree, or another vehicle 1 through which the driver cannot see ahead and whose area is larger than a predetermined value, the display control unit 43 updates driver's blind spot in consideration of the obstacle. If there is an obstacle ahead, added to the blind spot is an area on an opposite side of the origin out of an area defined by a group of lines each originated from the origin and passing through the obstacle. Information on driver's blind spot sequentially calculated in this way is used in step S04.

The display control unit 43 refers to driver's blind spot to determine whether the object is in this area. When it is determined that the object is not in driver's blind spot (No in step S04), the display control unit 43 displays the object in a normal manner (step S05).

Figure 11:
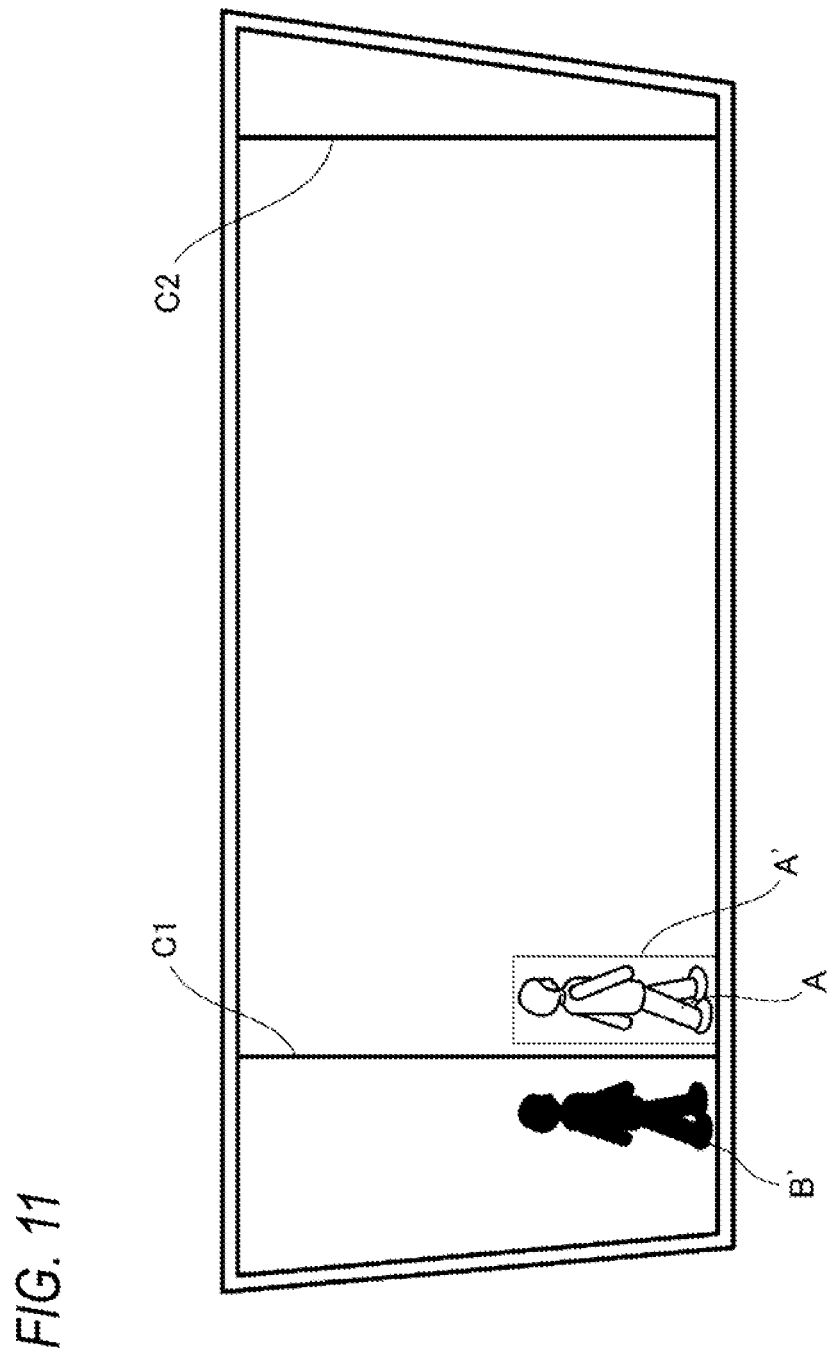
FIG. 11 shows a windshield on which an image is displayed by the HUD.

For example, the display control unit 43 causes the HUD 42 to display the object A shown in FIG. 9 in a normal manner to emphasize the object A. FIG. 11 shows the windshield 18 on which an image is displayed by the HUD 42. FIG. 11 shows a situation in which the building C1 is visible on a front left side and a building C2 is visible on a front right side through the windshield 18. As shown in FIG. 11, for example, the display control unit 43 causes the HUD 42 to display a red frame A' surrounding the object A (pedestrian) so that the object A can easily draw driver's attention. Displaying in a normal manner refers to displaying an object that has already been visible from the driver with emphasis. Displaying in a normal manner is not limited to displaying the red frame A', but frame in another color or emphasis other than a frame may be employed. Since the driver has already recognized the object, the display control unit 43 does not display an image indicating the object itself, however.

On the other hand, when it is determined that the object is out of driver's blind spot (Yes in step S04), the display control unit 43 generates an image indicating the object to causes the image to be displayed on the windshield 18 (step S06).

For example, the display control unit 43 displays an image B' indicating a pedestrian B in a position in which the pedestrian B is visible to the driver as if the building C1 were not presented. The image B' indicating the pedestrian B may be output from the camera 6 that captures the pedestrian B a mark simply indicating a pedestrian, or a mark indicating that there is some object. The display control unit 43 displays the image B' in a blinking manner, thereby emphasizing pedestrian (object) B's presence behind the building C1. In this way, if the object cannot be visually recognized by the driver, the display control unit 43 displays the image B' indicating the object. The image B' indicating the object is a camera image of the object itself or an image imitating the object.

In this way, a vehicular head-up display system 70 according to this embodiment is provided in a vehicle 1 and is configured to display a predetermined image to an occupant of the vehicle 1. The vehicular head-up display system 70 includes:
  a detection unit 433 that is configured to detect an object based on information acquired from in-vehicle sensors 5 and 6 to determine a position of the object;
  a determination unit 431 that is configured to determine whether the object is in blind spot of the driver; and
  an image output unit 432 that generates an image B' indicating the object to cause the image B' to be displayed on a display unit when a signal is acquired indicating that the determination unit determines the object is in the blind spot is acquired.

According to the vehicular head-up display system 70 of this embodiment, when the object is in driver's blind spot, the image indicating the object is displayed by the HUD 42, so that the driver can drive based on relevant information.

In the vehicular head-up display system 70 according to this embodiment, the HUD 42 is configured to perform displaying in different manners when the determination unit 431 determines that the object is in driver's blind spot and when the determination unit 431 determines that the object is out of driver's blind spot.

In this embodiment, when the display control unit 43 determines that the object is out of driver's blind spot, the display control unit 43 generates an image A' in which the object is emphasized instead of an image indicating the object itself to cause the image A' to be displayed on the windshield 18. On the other hand, when the display control unit 43 determines that the object is in driver's blind spot, the display control unit 43 generates an image of the object itself or an image B' indicating the object to cause the image B' to be displayed on the windshield 18.

For this reason, the driver can distinguish an object invisible to the driver from an object visible to the driver.

The vehicular head-up display system 70 according to this embodiment includes the in-vehicle sensor 6 provided in the headlamp 20 or a rear combination lamp.

The headlamp 20 or the rear combination lamp is provided away from driver's seat. For this reason, the viewpoint of the sensor 6 is largely different from that of the driver, so that the sensor 6 is likely to recognize an object in driver's blind spot. For this reason, the sensor 6 provided in the headlamp 20 or the rear combination lamp is suitable for the vehicular head-up display system 70.

The display control unit 43 may be provided in the vehicle 1 as in the above-described embodiment or in the HUD 42.

Although an example in which the HUD 42 is configured to cause an image to be displayed on the windshield 18 is described, the present invention is not limited thereto. The HUD 42 may cause an image to be displayed on a combiner provided in a vehicle interior.

For example, a camera image indicating the rear of the vehicle 1 may be displayed on the combiner based on output of the rear camera 6 configured to acquires information on the rear of the vehicle 1, an object originally invisible (object in driver's blind spot) in the camera image may be detected by a rear LiDAR 5 configured to acquire information on the rear of the vehicle 1, and the display control unit 43 may generate an image indicating the object detected by the rear LiDAR 5 to display the image with the camera image superimposed on the image. In this case, the rear camera 6 and the rear LiDAR 5 are provided in different positions.

In this way, a vehicular head-up display system 70 according to this modification of the present invention is provided in a vehicle 1 and is configured to display a predetermined image to an occupant of the vehicle 1. The vehicular head-up display system 70 includes:
 a camera 6 that is configured to acquire information on surroundings of the vehicle 1;
 a windshield or a combiner on which an image acquired from the camera is displayed;
 a detection unit 433 that is configured to detect an object based on information acquired from an in-vehicle sensor 5 to determine a position of the object;
 a determination unit 431 that is configured to determine whether the object is in an area invisible to the camera 6; and
 an image output unit 432 that generates an image indicating the object to cause the image to be displayed on the windshield or the combiner when a signal is acquired indicating that the determination unit 431 determines the object is in the area invisible to the camera 6 is acquired.

In addition, the vehicular head-up display system 70 may include a sensor 5 or a camera 6 configured to acquire information on the side of the vehicle 1. In this case, the sensor 5 and the camera 6 acquire information on the side of the vehicle 1, which is driver's blind spot, and the HUD 42 displays information acquired by the sensor 5 or the camera 6, thereby providing more information on the surroundings of the vehicle 1 with the driver. It is preferable that the vehicular head-up display system 70 including the sensor 5 and the camera 6 configured to acquire the information on the side of the vehicle 1 include the combiner on which an image of the camera configured to acquire the information on the side of the vehicle 1.

Although the driving mode of the vehicle according to the above embodiments include: the full automation mode; the advanced driver assistance mode; the driver assistance mode; and the manual driving mode, the driving mode of the vehicle should not be limited thereto. The driving mode of the vehicle may include at least one thereof. For example, only one driving mode of the vehicle may be executable.

Further, a classification and a name of the driving mode of the vehicle may be changed according to laws or regulations concerning self-driving in each country, as appropriate. Similarly, definitions of the "full automation mode," the "advanced driver assistance mode," and the "driver assistance mode" in the descriptions of the present embodiments are merely examples and may be changed according to laws or regulations concerning self-driving in each country, as appropriate.

The present application is based on a Japanese patent applications Nos. 2019-51485, filed on Mar. 19, 2019, 2019-51486, filed on Mar. 19, 2019, and 2019-51487, filed on Mar. 19, 2019, and the contents thereof are incorporated herein by reference.

INDUSTRIAL APPLICABILITY

According to the present invention, there is provided a head-up display in which dust does not lie easily on a transparent cover.

REFERENCE SIGNS LIST 1 vehicle
2, 2A vehicular system
3 vehicle control unit
4 vehicular display system
5 in-vehicle sensor
6A external camera
6B internal camera
7 radar
10 wireless communication unit
11 storage device
12 steering actuator
13 steering device
14 brake actuator
15 brake device
16 accelerator actuator
17 accelerator device
18 windshield
20 headlamp
21 light source unit
42 head-up display
43 display control unit
45 road-surface projection device
50 cleaner
51 air-blowing device
52 nozzle
53 air-guiding pipe
54 rectification unit
55 impeller
56 motor
57 intake port
58 sensor
59 indicator
60 cover member
61 rotation shaft portion
62 shade portion
63 motor
64 coil spring
65 stopper
66 temperature sensor
67 optical sensor
68 indicator
69 phosphorescent member
70 vehicular head-up display system
420 HUD body
422 housing
423 transparent cover
423 emission window
424 picture generation unit
425 control circuit board
426 lens
427 screen
428 concave mirror
429 wall 431 determination unit
432 image output unit
433 detection unit
531 motor control unit

The invention claimed is:

1. A vehicular head-up display that is provided in a vehicle and is configured to display a predetermined image to an occupant of the vehicle comprising:
a housing that has an opening upward;
a transparent cover that covers the opening of the housing;
a picture generation section comprising:
a picture generation unit that is provided inside an accommodation portion formed with the housing and the transparent cover in order to emit light for generating the predetermined image; and
a reflection unit that reflects light so that light emitted by the picture generation unit heads toward a windshield; and
a cleaner that is configured to clean an outer surface of the transparent cover;
wherein the cleaner is provided inside the housing and is configured to be actuated according to output of a dirt sensor configured to determine a degree of dirt on the transparent cover based on reflection of the light emitted from the reflection unit at the transparent cover.

2. The vehicular head-up display according to claim 1, wherein
the cleaner is an air-blowing mechanism configured to blow air to an outer surface of the transparent cover.

3. The vehicular head-up display according to claim 2, wherein
the cleaner is configured to blow air to the outer surface of the transparent cover from a driver's seat side toward a windshield side.

4. The vehicular head-up display according to claim 3, wherein
the transparent cover has a concave shape in which a valley portion is provided between the driver's seat side and the windshield side, and
the cleaner is configured to blow air toward the valley portion.

5. The vehicular head-up display according to claim 2, wherein
the cleaner comprises: a plurality of nozzles; an air-blowing device configured to blow air from the plurality of nozzles; and an air-guiding pipe connecting the air-blowing device and the plurality of nozzles.

6. The vehicular head-up display according to claim 1, wherein
the cleaner is actuated when a power source of the vehicle is turned on.

7. The vehicular head-up display according to claim 1, wherein
a notification unit is actuated when a signal indicating that the transparent cover is dirtier than a predetermined degree is acquired from the dirt sensor even after the cleaner was actuated.

8. A vehicular head-up display that is provided in a vehicle and is configured to display a predetermined image to an occupant of the vehicle comprising:
a picture generation unit that is configured to emit light for generating the predetermined image;
a reflection unit that reflects light emitted by the picture generation unit to a windshield and comprise at least a concave mirror; and
a shade unit that is capable of blocking light from entering the picture generation unit, wherein
the shade unit is movable between:
a closed position in which an optical path between the picture generation unit and the concave mirror is blocked, and
an open position in which the optical path between the picture generation unit and the concave mirror is not blocked.

9. The vehicular head-up display according to claim 8, wherein
the shade unit moves to the closed position when a power supply of the head-up display is turned off, and
the shade portion moves to the open position when the power source of the head-up display is turned on.

10. The vehicular head-up display according to claim 8, wherein
the shade portion is configured to move to the closed position or the open position according to output of a temperature sensor configured to measure a temperature of the picture generation unit or an optical sensor configured to measures an intensity of sunlight or light emitted from the picture generation unit.

11. The vehicular head-up display according to claim 10, wherein
a notification unit is actuated to notify that the head-up display is not available when the shade portion is in the closed position.

12. The vehicular head-up display according to claim 8, wherein
the shade portion is provided with a solar cell or a phosphorescent member.

13. The vehicular head-up display according to claim 12, wherein
the shade portion provided with the phosphorescent member is provided in a position closer to the picture generation unit than the concave mirror.

14. A vehicular head-up display system that is provided in a vehicle and is configured to display a predetermined image to an occupant of the vehicle comprising:
a detection unit that is configured to detect an object based on information acquired from an in-vehicle sensor to detect a position of the object;
a determination unit that is configured to determine whether the object is in a blind spot of the driver;
a shade unit that is capable of blocking light from entering a picture generation unit; and
an image output unit that generates an image indicating the object to cause the image to be displayed on a display unit when a signal is acquired indicating that the determination unit determines the object is in the blind spot,
wherein the image output unit generates an image by taking light generated by the picture generation unit and reflecting it off of a reflection unit onto the display unit,
wherein the reflection unit comprises at least a concave mirror,
wherein the shade unit is movable between:
a closed position in which an optical path between the picture generation unit and the concave mirror is blocked, and
an open position in which the optical path between the picture generation unit and the concave mirror is not blocked.

15. The vehicular head-up display system according to claim 14, wherein
the image output unit is configured to generate an image indicating the object in different manners when the signal is acquired indicating that the determination unit determines the object is in the blind spot and when a signal is acquired indicating that the determination unit determines the object is out of the blind spot.

16. The vehicular head-up display system according to claim 14, further comprising:
an in-vehicle sensor that is provided in a headlamp or a rear combination lamp.

17. The vehicular head-up display according to claim 8 wherein, the shade unit comprises:
a shade portion; and
a rotation shaft portion that rotates the shade portion.

18. The vehicular head-up display according to claim 14 wherein, the shade unit comprises:
a shade portion; and
a rotation shaft portion that rotates the shade portion.

\* \* \* \* \*